United States Patent [19]

Lilja

[11] Patent Number: 4,561,319
[45] Date of Patent: Dec. 31, 1985

[54] ARRANGEMENT FOR JOURNALLING LARGE ECCENTRIC FORCES

[75] Inventor: Per Lilja, Karlskrona, Sweden

[73] Assignee: Dynapac AB, Solna, Sweden

[21] Appl. No.: 573,861

[22] Filed: Jan. 25, 1984

[30] Foreign Application Priority Data

Jan. 26, 1983 [SE] Sweden .................................. 8300373

[51] Int. Cl.$^4$ ............................................. F16H 33/00
[52] U.S. Cl. ............................................ 74/61; 74/87; 404/117
[58] Field of Search ................. 74/61, 87; 173/49; 404/117, 133; 366/128

[56] References Cited

U.S. PATENT DOCUMENTS

| | | | |
|---|---|---|---|
| 2,248,182 | 7/1941 | Mateer | 74/61 |
| 2,930,244 | 3/1960 | Hutchinson et al. | 74/61 |
| 3,026,781 | 3/1962 | Schäfer | 74/87 X |
| 4,289,042 | 9/1981 | Brown | 74/61 |
| 4,481,835 | 11/1984 | Storm | 74/61 |

FOREIGN PATENT DOCUMENTS

974916 10/1950 France ................................ 74/61
313108 6/1929 United Kingdom ................. 74/61

Primary Examiner—Samuel Scott
Assistant Examiner—Allen J. Flanigan
Attorney, Agent, or Firm—Walter Ottesen

[57] ABSTRACT

The invention is directed to an arrangement for journalling large eccentric forces which are generated by a rotating eccentric assembly. One problem associated with the bearing arrangements of these forces is that the size of the bearing is extremely large which, in turn, results in shaft speed limits that are readily exceeded. By dividing the eccentric assembly into two or more tubular eccentric weights arranged coaxially in relation to each other and journalling these in separate bearings on shaft journals connected to the structure to which vibratory motion is to be imparted, a distribution of the eccentric forces is obtained together with a reduction of the bearing dimensions. The eccentric weights are driven by means of a drive rod arranged on a drive shaft interacting with the eccentric weights. The journalling arrangement and eccentric assembly can be part of a vibration arrangement for imparting vibratory motion to the roller structure of a compactor for compacting soil, asphalt or the like.

6 Claims, 4 Drawing Figures

ARRANGEMENT FOR JOURNALLING LARGE ECCENTRIC FORCES

FIELD OF THE INVENTION

The invention relates to an arrangement for journalling eccentric assemblies that include rotatable eccentric shafts. The arrangement reduces the loads on the bearings of the eccentric members. Also, the invention relates to a vibration arrangement incorporating an eccentric assembly wherein the loads on the bearings thereof are reduced.

BACKGROUND OF THE INVENTION

Vibration arrangements of the kind referred to above are generally used in compactors for compacting soil, asphalt or the like. The amplitude of the vibratory movement can be fixed or it can be continuously adjusted as disclosed in U.S. Pat. No.4,481,835 entitled "Device for Continuous Adjustment of the Vibration Amplitudes of Eccentric Elements".

However, irrespective of whether the amplitude of vibration is fixed or adjustable, there has been a problem associated with the journalling of large eccentric forces. More specifically, the dimensions of the bearings are extremely large and there is the danger that the permissible shaft speed limits can be readily exceeded. To obviate this danger, it has been suggested to journal the rotational shaft of the eccentric member in two bearings on each side of the member. However, this solution brings with it the disadvantage that the bearing forces will be unevenly distributed because of the elasticity of the shaft.

Another way of solving the bearing problem is to journal two separate eccentric members in two bearings each at the respective ends of the common rotational shaft of the eccentrics. However, this is a comparatively expensive solution.

In connection with the configuration of bearing arrangements for an assembly with adjustable vibration amplitude, one solution would be to arrange the assembly in the form of two coaxial shafts fitted with respective eccentrics. A common version of such an assembly is a hollow shaft and a solid shaft arranged therein. Both shafts are provided with eccentric means, the hollow shaft being rotatably journalled on the inner solid shaft.

The disadvantage of this bearing arrangement is that the bearing of the inner shaft must be dimensioned for the maximum eccentric force. Furthermore, the eccentric shafts as a rule are stationary in relation to each other during vibration with the attendant danger of pitting readily arising in the bearing race of the bearings of the hollow eccentric shaft. If a plain bearing is used instead for the outer eccentric member to avoid such pitting, it will give rise to considerable friction and large forces for adjustment will result. Furthermore, the plain bearing requires good lubrication.

SUMMARY OF THE INVENTION

It is an object of the invention to provide an arrangement for journalling large eccentric forces generated by a rotating eccentric assembly wherein the loads on the bearings thereof are reduced. It is a further object of the invention to provide a vibration arrangement for the roller structure of a compactor wherein such bearing loads are reduced.

The arrangement of the invention for journalling large eccentric forces generated by a rotating eccentric assembly includes two or more tubular shafts fitted with eccentric weights. According to a feature of the invention, the tubular shafts are journalled coaxially in relation to each other in bearings which are independent of each other and arranged on separate axle journals. Further, the drive shaft of the eccentric assembly is provided with a drive rod interacting with the eccentrically-loaded tubular shafts.

With the bearing arrangement according to the invention, the maximum load on each bearing is reduced to one-fourth, one-sixth, etc., of the total eccentric load. Furthermore, pitting is prevented in any bearing since the bearings of each eccentric member rotate continuously while the eccentric assembly is in rotation. Accordingly, with an eccentric assembly including two eccentric shaft members, each bearing is loaded with one-fourth of the total load of the entire eccentric assembly. If the total eccentric mass is divided in three eccentric shafts coaxially journalled in separate bearings, then each bearing would be loaded with one-sixth of the total load.

BRIEF DESCRIPTION OF THE DRAWINGS

The invention will now be described with reference to the drawing wherein.

DESCRIPTION OF THE PREFERRED EMBODIMENTS OF THE INVENTION

Figure 1:
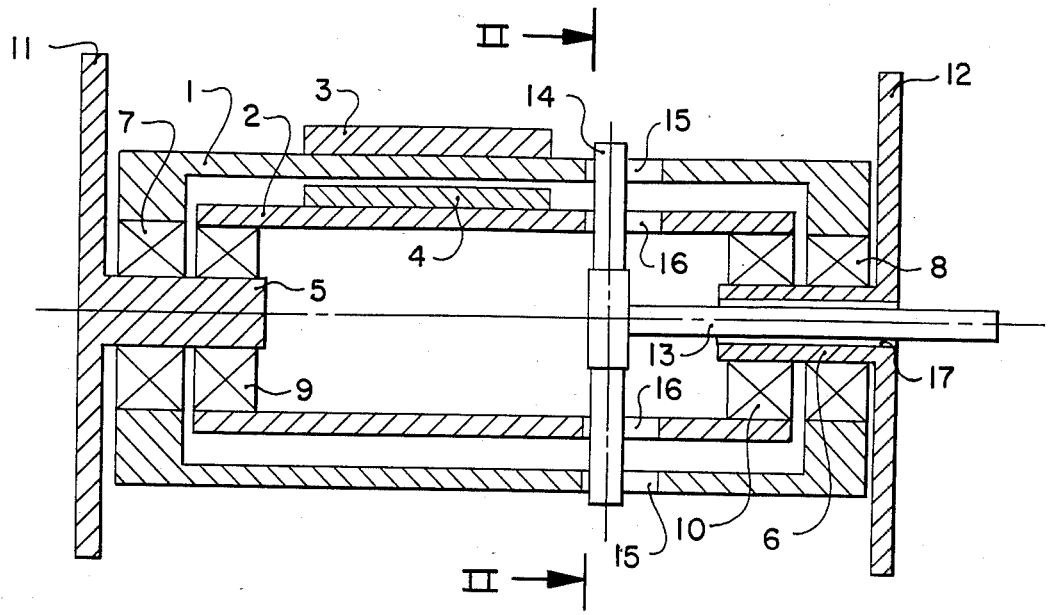
FIG. 1 is a side elevation view, in longitudinal section, of a vibration arrangement incorporating an eccentric assembly and having a bearing arrangement therefor pursuant to one embodiment of the invention.
Figure 2:
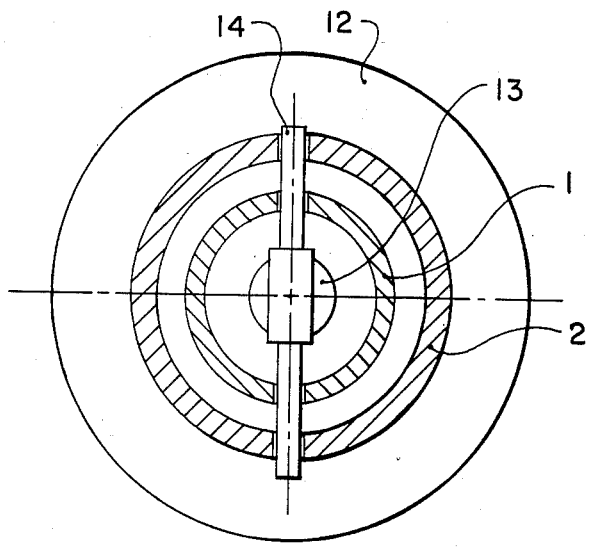
FIG. 2 is a section view taken along line II—II of FIG. 1.

Referring to FIG. 1, the bearing arrangement is shown as part of a vibration arrangement which includes an eccentric assembly having two tubular shafts 1 and 2 arranged coaxially in relation to each other. The shafts 1 and 2 are provided with eccentric weights 3 and 4, respectively. The ends of the shaft 1 are individually journalled on separate shaft journals 5 and 6 by bearings 7 and 8, respectively. Similarly, shaft 2 is journalled on journals 5 and 6 by bearings 9 and 10, respectively. In the embodiment illustrated, the shaft journals 5 and 6 are integral parts of side plates 11 and 12, respectively, of a vibrating drum constituting, for example, part of a vibratory roller assembly of a compactor for compacting soil, asphalt or similar materials.

The eccentric shafts of the eccentric assembly can be driven in various ways. Accordingly, one of the eccentrics may act as a driver for the other or, as in the embodiment shown in the drawing, the eccentric shafts can be driven by a drive shaft 13 extending through the center common to the shafts 1 and 2 as indicated by reference numeral 17. The drive rod 14 is fixed rigidly to the drive shaft 13 so as to be perpendicular thereto. A condition for realization of the invention is that the drive shaft 13 with its drive rod 14 is completely relieved of the eccentric forces generated by the eccentric assembly. This situation is present because the drive means is not connected to the concentric hollow shafts 1 and 2 at their axes of rotation and, instead, engages the shafts 1 and 2 at their respective cylindrical walls in slots 15 and 16, respectively.

Figure 3:
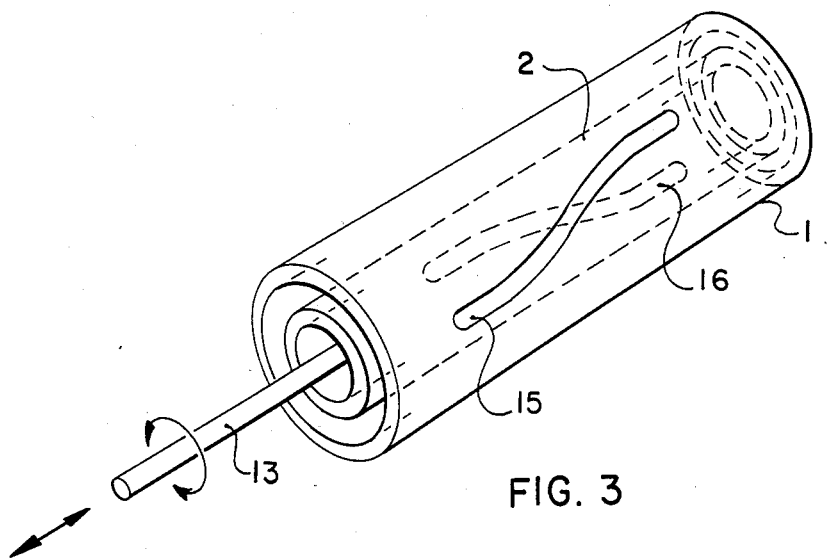
FIG. 3 is a simplified perspective view of the eccentric members to show a configuration of the slots formed therein for accommodating the drive rod fixedly attached to the drive shaft; and, FIG. 4 illustrates a vibration arrangement according to another embodiment of the invention wherein only one end of the drive rod penetrates and engages the eccentric members.

The slot-like openings 15 and 16 are arranged in the peripheral longitudinally extending walls of the eccentrically loaded shafts 1 and 2 and are shown schematically in the perspective view of FIG. 3 wherein the drive rod 14 has been omitted for clarity. The openings 15 and 16 are arranged diametrically in relation to each other and are disposed opposite each other so that the drive rod 14, which is rigidly mounted on drive shaft 13 and extends on both sides of the drive shaft 14, can extend out through the openings 15 and 16, respectively.

By configuring the openings 15 and 16 as spiral slots twisting in opposite directions to each other as shown in FIG. 3 and arranging the drive shaft 13 to move axially, it is possible to adjust the angular positions of the respective shafts 1 and 2 and therefore the positions of the two eccentric weights 3 and 4 in relation to each other and so bring about an adjustment of the vibration amplitude of the composite eccentric assembly. Axial movement of drive shaft 13 causes the drive rod 14 to follow slots 15 and 16 and thus rotates the eccentric weights 3 and 4 in opposite directions in relation to each other. The drive means comprising the drive shaft 13 and drive rod 14 can be powered by a hydraulic actuating assembly of the kind disclosed, for example, in U.S. Pat. No. 4,481,835, referred to above.

In the case of eccentric shafts which are fixed in relation to each other, it is not necessary for the tubular eccentric shafts 1 and 2 to have two diametrically arranged openings 15 and 16, respectively.

Figure 4:
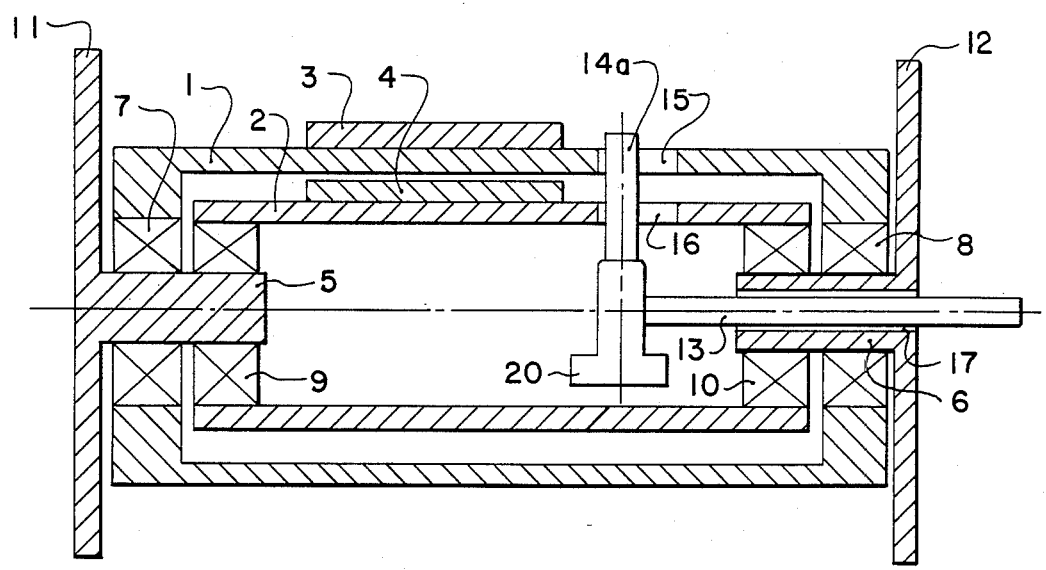

Under certain circumstances and referring to FIG. 4, it may be advantageous to fit the eccentric shafts 1 and 2 with only one opening 15 and 16, respectively, which are disposed coaxially in relation to each other. The drive rod 14a arranged perpendicularly to drive shaft 13 then protrudes in only one direction and engages the two openings 15 and 16. To prevent rod 14a from subjecting the drive shaft 13 to centrifugal forces during rotation of drive shaft 13, the latter is provided with a counterweight 20 to counterbalance the drive rod 14a.

In an embodiment of the vibration arrangement wherein the vibration amplitude is adjustable, the drive shaft 13 is rotatably journalled in a plain sleeve bearing which is mounted inside one of the shaft journals 6 rigidly fixed to the structure 12 to which vibratory movement is imparted.

The invention is not limited to an eccentric assembly comprising only two eccentrically-loaded shafts. The eccentric assembly can be divided up into several eccentric weights which are journalled in separate bearings without going beyond the scope of the invention.

The invention is also not limited to vibration arrangements for imparting vibratory movements to vibratory structures such as compacting rollers or the like. Neither is the invention limited to eccentric assemblies with adjustable vibration amplitude. Of significance is that each and every one of the eccentric forces of the eccentric weights journalled in separate bearings is absorbed by the respective bearings of the weights so that the drive shaft is completely relieved of these forces. This means that the drive shaft and the slot-like openings in the walls of the eccentric weights coacting therewith should be configured so as to permit any deflection of the eccentric weights because of their elasticity.

It is understood that the foregoing description is that of the preferred embodiments of the invention and that various changes and modifications may be made thereto without departing from the spirit and scope of the invention, as defined in the appended claims.

What is claimed is:

1. An arrangement for journalling large eccentric forces generated by a rotating eccentric assembly including at least two eccentrically-loaded members, the arrangement comprising:

first journal means and second journal means spaced from each other and conjointly defining a common journalling axis;

a first pair of bearings for rotatably journalling a first one of said eccentrically-loaded members on said first journal means and said second journal means;

a second pair of bearings for rotatably journalling a second one of said eccentrically-loaded members directly on said first journal means and said second journal means independently of said first eccentrically-loaded member;

said eccentrically-loaded members being tubular members each having a tubular wall and an axis of rotation coincident with said common journalling axis and being loaded with an eccentric weight; and, drive means for engaging and driving said eccentrically-loaded members, said drive means including: bearing means disposed on said axis and defining a journalling axis coincident with said common journalling axis; first engaging means and second engaging means formed in the respective tubular walls of said tubular members at respective locations spaced away from said common axis; and, a drive member journalled in said bearing means configured to engage and drive said tubular members at said first engaging means and said second engaging means, respectively, whereby eccentric forces generated by the tubular members during rotation thereof are prevented from acting on said drive member.

2. The arrangement of claim 1 wherein the arrangement is adpated to impart vibratory movements to a vibration structure, said first journal means and said second journal means both being rigidly fixed to said vibration structure.

3. An arrangement for journalling large eccentric forces generated by a rotating eccentric assembly including at least two eccentrically-loaded members, the arrangement comprising:

first journal means and second journal means spaced from each other and conjointly defining a common journalling axis;

a first pair of bearings for rotatably journalling a first one of said eccentrically-loaded members on said first journal means and said second journal means;

a second pair of bearings for rotatably journalling a second one of said eccentrically-loaded members directly on said first journal means and said second journal means independently of said first eccentrically-loaded member;

said eccentrically-loaded members being tubular members each having an axis of rotation coincident with said common journalling axis and each being loaded with an eccentric weight;

a shaft bearing disposed in one of said journal means so as to be entirely separate from said pairs of bearings and defining a journalling axis coincident with said common journalling axis; and, drive means for engaging and driving said eccentrically-loaded members;

said drive means including:

first guide means and second guide means formed in said tubular members, respectively;

a drive shaft movably journalled in said shaft bearing;

a drive rod mounted on said drive shaft so as to extend radially thereof for engaging said first guide means and said second guide means so as to permit said tubular members to be driven by said drive rod upon movement of said drive shaft; and, said first guide means and said second guide means being disposed and configured with respect to each other on said respective tubular members so as to prevent eccentric forces generated by the tubular members during rotation thereof from acting on said drive rod and said drive shaft.

4. The arrangement of claim 3, said first guide means being two mutually-adjacent slot-like openings formed in the peripheral longitudinally extending wall of said first tubular member so as to be diametrically opposite each other; said second guide means being two mutually adjacent slot-like openings formed in the peripheral longitudinally extending wall of said second tubular member so as to be diametrically opposite each other, said drive rod penetrating each of said openings for interacting with said tubular members.

5. The arrangement of claim 3, said first guide means and said second guide means being respective slot-like openings formed in the peripheral longitudinally extending wall of said first and second tubular members, respectively; one end of said drive rod penetrating said slot-like openings for interacting with said tubular members; and, said drive means further comprising counterweight means arranged on said drive shaft for balancing the eccentricity caused by said drive rod.

6. A vibration arrangement for imparting vibratory movements to a rotatable vibrative structure such as the roller of a compactor for compacting soil, asphalt or the like, the vibration arrangement comprising:

first journal means and second journal means both mounted with respect to the vibratory structure so as to be mutually adjacent;

first elongated eccentric means extending between said first journal means and said second journal means;

a first pair of bearing for rotatably journalling said first eccentric means directly on said first journal means and said second journal means;

a second elongated eccentric means likewise extending between said first journal means and said second journal means;

a second pair of bearings for rotatably journalling said second eccentric means on said first journal means and said second journal means independently of said first eccentric means;

said first and second elongated eccentric means being tubular members each having a tubular wall and an axis of rotation coincident with said common journalling axis and each being loaded with an eccentric weight; and, drive means for driving said first eccentric means and said second eccentric means, said drive means including: bearing means disposed on said axis and defining a journalling axis coincident with said common journalling axis; first engaging means and second engaging means formed in the respective tubular walls of said tubular members at respective locations spaced away from said common axis; and, a drive member journalled in said bearing means and configured to engage and drive said tubular members at said first engaging means and said second engaging means, respectively, whereby eccentric forces generated by the tubular members during rotation thereof are prevented from acting on said drive member.

* * * * *

UNITED STATES PATENT AND TRADEMARK OFFICE
CERTIFICATE OF CORRECTION

PATENT NO. : 4,561,319

DATED : December 31, 1985

INVENTOR(S) : Per Lilja

It is certified that error appears in the above-identified patent and that said Letters Patent is hereby corrected as shown below:

In column 4, line 38: add -- and -- after the word "means".

In column 4, line 46: delete "adpated" and substitute -- adapted -- therefor.

In column 6, line 11: delete "bearing" and substitute -- bearings -- therefor.

Signed and Sealed this

Twentieth Day of May 1986

[SEAL]

Attest:

DONALD J. QUIGG

Attesting Officer

Commissioner of Patents and Trademarks